J. A. FRIDDLE, DEC'D.
M. C. FRIDDLE, EXECUTRIX.
PEDAL CONTROL MECHANISM FOR MOTOR VEHICLES.
APPLICATION FILED DEC. 28, 1917.
1,321,615.
Patented Nov. 11, 1919.
4 SHEETS—SHEET 4.
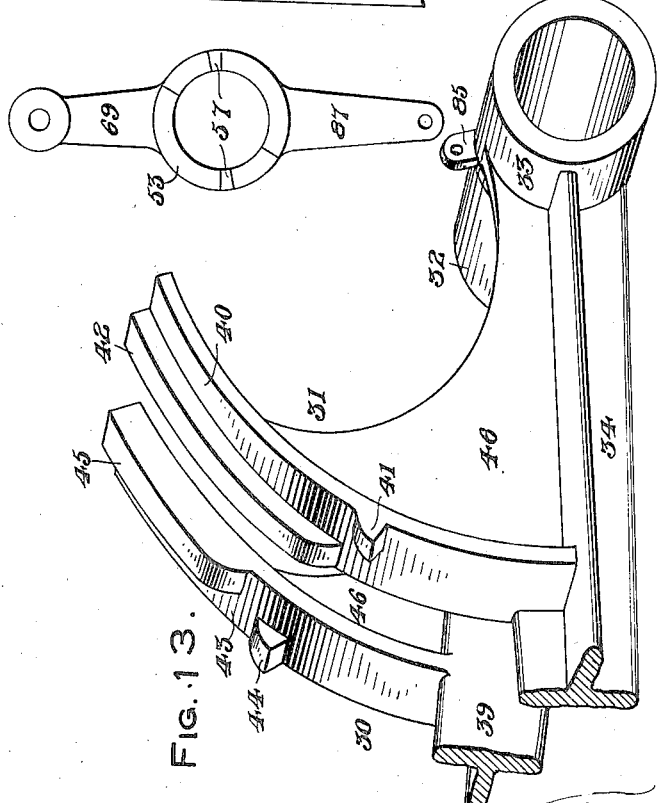
Inventor
J. A. Friddle
By T. A. Bryant
Attorney.

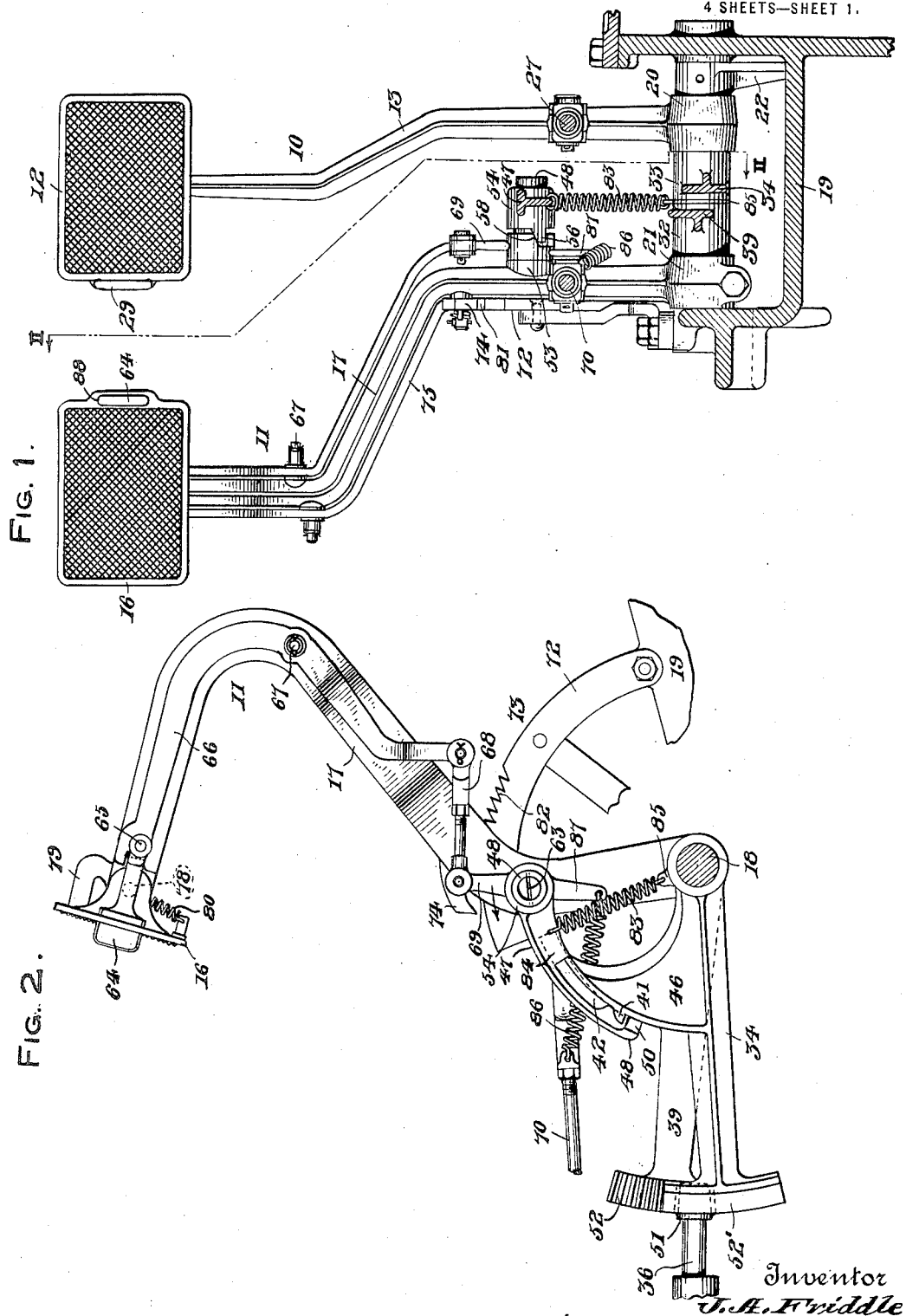

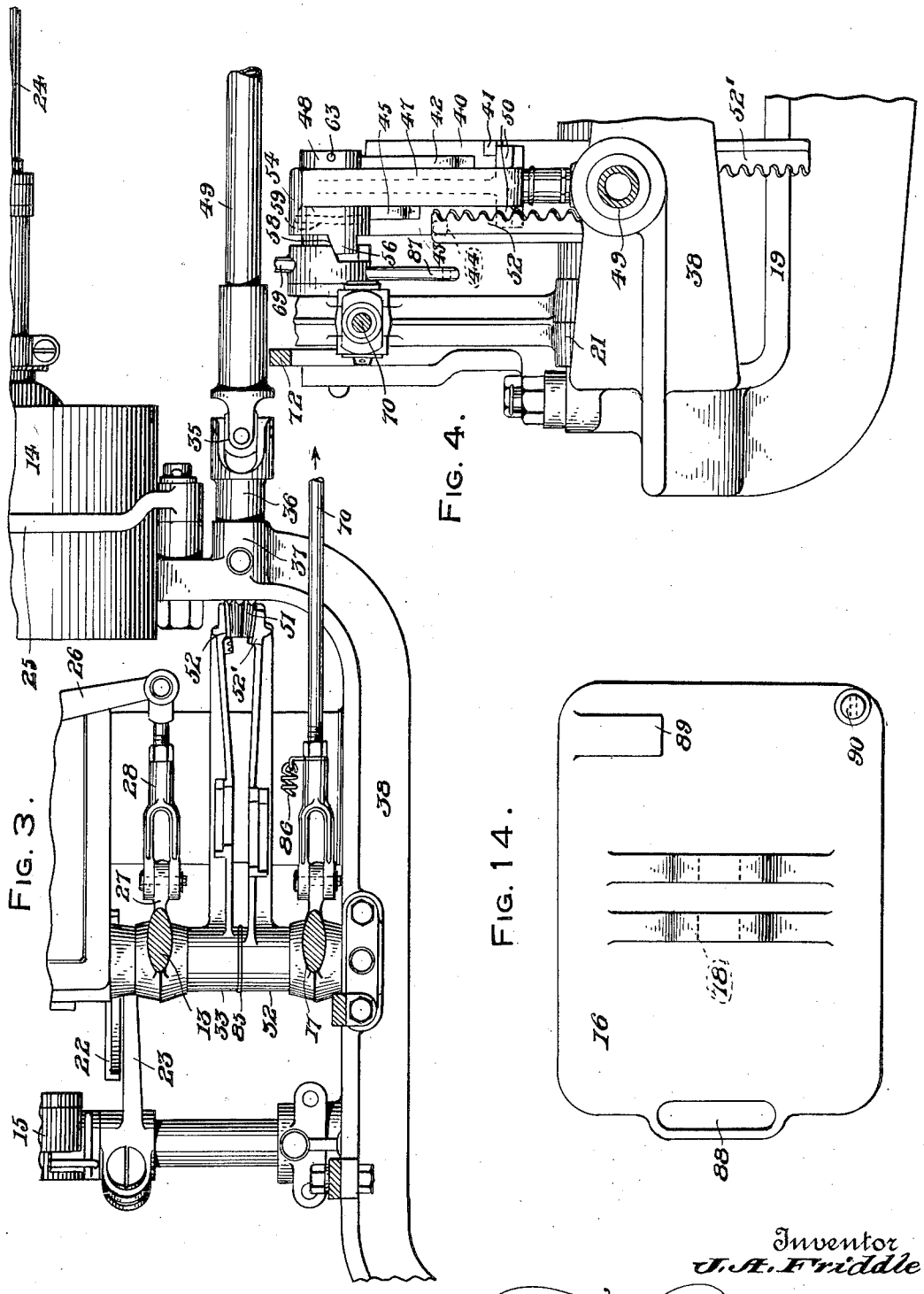

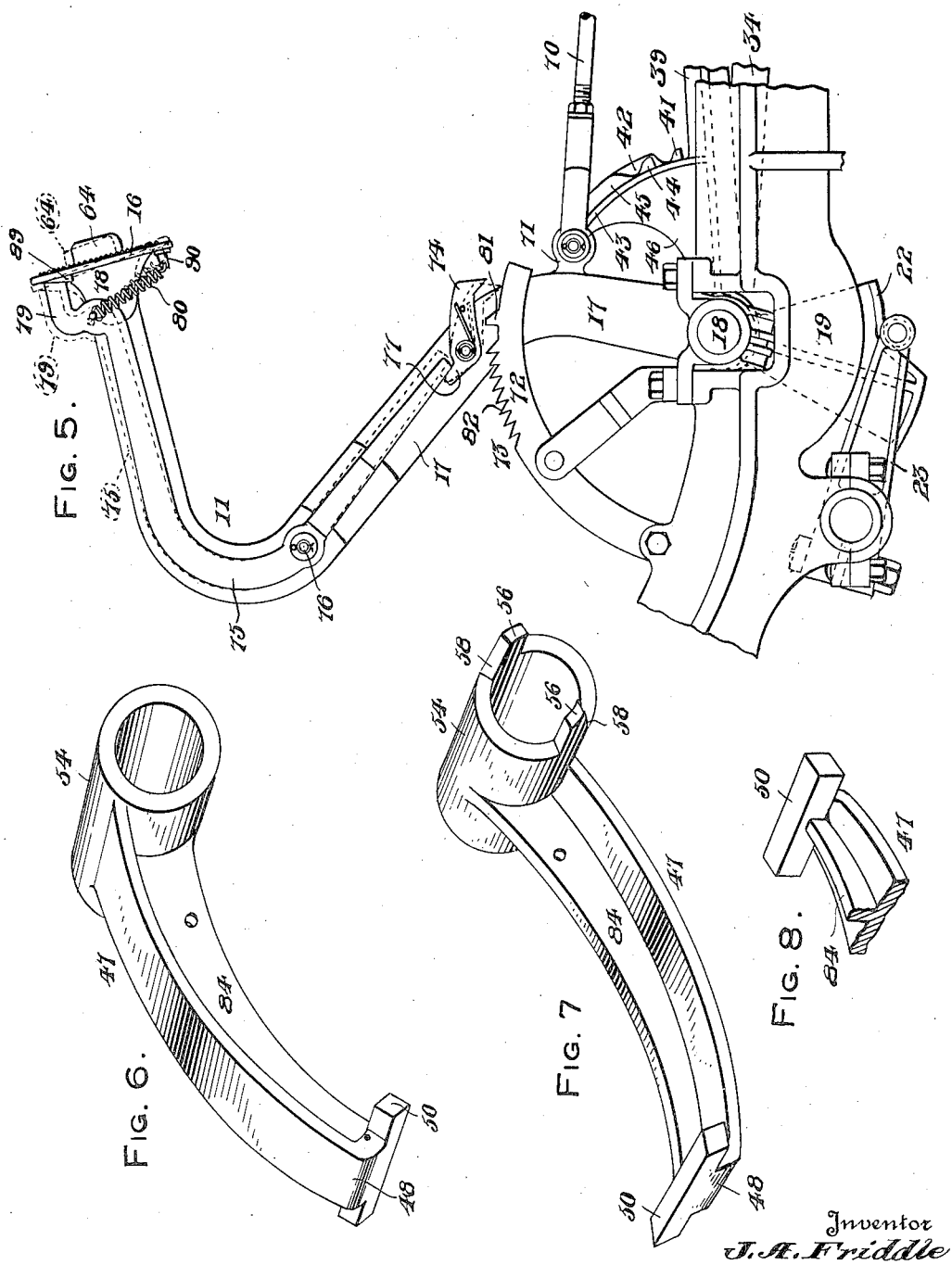

UNITED STATES PATENT OFFICE.

JAMES A. FRIDDLE, OF CLEVELAND, OHIO; MATILDA C. FRIDDLE EXECUTRIX OF SAID JAMES A. FRIDDLE, DECEASED.

PEDAL-CONTROL MECHANISM FOR MOTOR-VEHICLES.

1,321,615.   Specification of Letters Patent.   Patented Nov. 11, 1919.

Application filed December 28, 1917. Serial No. 209,255.

*To all whom it may concern:*

Be it known that I, JAMES A. FRIDDLE, a citizen of the United States of America, residing at Cleveland, in the county of Cuyahoga and State of Ohio, have invented certain new and useful Improvements in Pedal-Control Mechanism for Motor-Vehicles, of which the following is a specification.

This invention relates to new and useful improvements in pedal control mechanism for motor vehicles.

The primary object of this invention is the provision of an arrangement of controlling pedals for an automobile whereby all of the mechanical movements incident to the control of the vehicle may be readily and quickly accomplished by the feet of the driver when the driver is positioned upon the seat of the automobile.

The further object of the invention is to provide a pedal operated controlling device for clutch operating mechanism located at the rear construction of the vehicle and more especially for that class of such designated mechanism as set forth in my pending application, Serial Number 183,467 filed on July 30, 1917.

A still further object of the device is a ready means of controlling rearwardly positioned speed change mechanism from the driver's seat of the motor vehicle by means of a pedal in such a manner that the usual forward movement of the pedal for applying the brake automatically positions the speed change gears first in their neutral and then in their low speed arrangement, while the continued movement of the pedal applies the said brake, at the rear construction, as in any emergency brake.

As heretofore noted, my invention is primarily designed for controlling speed change mechanism arranged at the rear construction of the automobile by means of a pedal located adjacent the driver's seat and the arrangement is such that this rear construction operating pedal when normally moved forwardly, automatically throws the mechanism into its low speed connections and the extreme forward movement of the same pedal applies the rear emergency brake so that upon stopping the vehicle by means of this pedal alone, the gears will be normally arranged or set at low speed, with the motor unclutched and running free.

The said speed-change pedal however, may designedly be forwardly operated for shifting the gears to high speed or to neutral position from their low speed arrangement and the gears will so remain as designedly positioned until said pedal is subsequently moved forwardly for placing them at low speed.

The said speed-change pedal will be herein referred to as the "rear control" pedal while another pedal is arranged adjacent thereto for controlling the forwardly positioned service brake on main shaft of the motor, and this will be termed the "front control" pedal. The rear-control pedal may therefore be moved to and set at its neutral position and which operation will change the speed-change gears to their neutral arrangement whether they are positioned at low or high speed, while the further movement of said pedal forwardly from its neutral position will change the gears to their opposite arrangement either high or low as the case may be, it being understood however, that no such change to high speed will occur without accomplishing a certain designed adjustment of the rear control pedal prior to its forward operative movement. The rear control pedal may be forwardly moved for only opening the motor clutch and applying the rear brake.

In the drawings forming a part of this application and in which like designating characters refer to corresponding parts throughout the several views, Figure I is an elevational view of the controlling pedals with the adjacent elements shown in vertical section.

Fig. II is a vertical sectional view taken upon line II—II of Fig. I.

Fig. III is a horizontal sectional view taken through the pedals with the adjacent mechanism shown in top plan.

Fig. IV is a vertical sectional view slightly enlarged of the lower portion of the pedal mechanism with the adjacent parts shown in elevation.

Fig. V is an elevational view of the opposite side of the rear control pedal from that shown in Fig. II.

Fig. VI is a perspective view of the selecting pawl.

Fig. VII is an inverted perspective view thereof.

Fig. VIII is a detail perspective view of the hooked operating end of the pawl.

Fig. IX is a side view of the attaching end of the pawl.

Fig. X is an elevational view of a portion of the rear control pedal with the pawl mounting means shown in section.

Fig. XI is an elevational view of the selecting gear operating plates with the selecting pawl, parts being broken away.

Fig. XII is a side view of the shifting collar for the pawl detached.

Fig. XIII is a perspective view of the selecting gear cam plates with the gear arms broken away, and Fig. XIV is a bottom plan view of one of the pedal plates employed.

It will first be noted that my invention contemplates two controlling pedal mechanisms 10 and 11, the former designated the "front control" pedal and broadly consisting of the foot plate 12 and lever 13 for manipulating a service brake 14, adjacent the forward end of the automobile in the vicinity of the said pedals 10 and 11.

The said pedal 11 broadly consists of a similar foot plate 16 and lever 17 and is designed for operating speed change mechanism positioned adjacent the rear construction of the automobile and for which reason the pedal mechanism 11 is termed the "rear control" pedal. It will be further understood that the pedal mechanism 11 is especially designed for use in connection with a speed changing clutch or operating mechanism such as that fully set forth in my pending application, Serial Number 183467, heretofore referred to and in which the changing of the gears from low to high and vice versa as well as to their neutral positions, is accomplished by causing the rotation of a shaft 49 arranged longitudinally of the vehicle.

The lever 13 of the front control pedal 10 is journaled by means of a hub 20 upon a shaft 18, journaled in a frame portion 19 of the automobile, the said hub 20 being spaced from the shaft 18 of the pedal lever 17, which is fixed upon the said shaft 18. A clutch releasing cam 22 is secured to the shaft 18 for engaging and depressing the operating arm 23 of the clutch 15. Upon moving the foot plate 16 forwardly, the cam 22 is shifted rearwardly and the arm 23 depressed, which releases the clutch 15 in the usual and well-known manner so that the driving shaft 24 is disconnected from the motor, permitting the motor to run free regardless of the driving mechanism employed.

The service brake 14 is operatively connected to the lever 13 by any well known mechanism such as the coöperating levers 25 and 26 which are attached to the pedal lever 13 as at 27 as by means of an adjustable pivotal link connection 28. It will be understood from this description of the front control pedal mechanism 10 that the lever 13 is normally positioned at the rearward limit of its movement by means of the brake spring and with the brake 14 released, while a forward movement of the lever 13 under the impulse of the foot of the operator upon the plate 12 moves the lever 13 forwardly and applies the service brake 14. A projecting guard 29 is arranged at the inner edge of the foot plate 12, assisting to prevent the foot from leaving the plate 12 at the inner edge thereof which is the side adjacent the rear control pedal mechanism 11.

Separately operable selecting members 30 and 31 adapted for accomplishing low and high speed changes respectively are journaled upon the shaft 18 intermediate the hubs 20 and 21 by means of sleeves 32 and 33 respectively. The high speed selecting member 31 has an arm 34 projecting from its sleeve 33 arranged with an arcuate gear 52' at its free end in constant engagement with a pinion 51 operatively connected to the aforementioned longitudinal controlling shaft 49 by means of a universal joint 35, the said pinion having a stub shaft 36 journaled in a bearing 37 of the automobile frame 38.

In a similar manner the sleeve 32 of the low speed selecting member 30 has an arm 39 provided at its free end with an arcuate gear 52 in constant mesh with the pinion 51 opposite the high speed selecting gear 52' and the gears 52, 52' are so arranged relatively of the pinion 51 that when either of the gears is at one extremity of its vertical movement, the other gear will be at the opposite limit of its movement. It will be evident that the said gears are adapted to move simultaneously and in opposite directions, thereby revolving the stub shaft 36 and shaft 49 in the required direction for accomplishing the desired object of effecting either a high or low change of speed in the rearwardly positioned speed change mechanism.

The arm 34 is provided with an arcuate cam plate 40 having an outwardly projecting lug 41 adjacent its outer edge and an elongated pawl release 42 at its inner edge, while the arm 39 is arranged with a similar cam plate 43 having a lug 44 adjacent its outer edge and a pawl release 45 at the inner edge thereof, it being understood that the plates 40 and 43 are arranged in parallelism, while similar webs 46 connect the inner concaved faces of the plates 40 and 43 with their respective arms 34 and 39.

A selecting pawl 47 is journaled upon an axle 48 projecting from the inner side of the lever 17, the said pawl being slightly curved and having a hooked free end 48 terminating in a transverse block 50 adapted to ride upon the faces of the cam plates 40 and 43. A shifting collar 53 is arranged upon the axle 48 inwardly of the hub 54 of the pawl 47, the said collar 53 having notches 55 adapted for receiving lugs 56 projecting from the pawl hub 54, inclined sides 57 being provided for the notches 55 adapted to engage inclined edges 58 of the lugs 56 and whereby the turning of the collar 53 in the direction indicated by the arrow in Fig. 2 of the drawings is adapted for shifting the pawl 47 toward the free end of the axle 48.

The hub 54 is limited in rotation relatively of the axle 48 but permitted to move longitudinally thereof by means of a pin 59 transversely carried through the hub 54 and freely arranged through a slot 60 in the axle 48. The slot 60 communicates with a central bore 61 of the axle 48 so that the pin 59 also traverses the bore 61 while a spring 62 is arranged within the bore tension between the pin 59 and a stop 63 at the outer end of the bore 61 and whereby the hub 54 is resiliently maintained in contact with the sleeve 53 as well as normally arranged at the inward limit of its movement.

When the collar 53 is turned relatively of the axle 48 and the hub 54 moved outwardly upon the axle, the block 50 of the pawl 47 is brought into the path of movement of the lug 41 of the cam plate 40 and so as to engage the lug 41 when the pawl 47 is elevated, thereby elevating the high speed plate 40 for operating the high speed selected gear 52'. This shifting of the collar 53 is accomplished by depressing a set pedal 64 arranged at the inner edge of the pedal plate 16 and corresponding to the guard 29 of the pedal plate 12, it being understood that the pedal 64 is slidably arranged through the plate 16, and is pivoted as at 65 to a set lever 66 which in turn is pivoted at 67 to the lever 17 and has its free lower end pivotally connected by an adjustable link 68 with a finger 69 carried by the collar 53.

When the pawl 47 is in its normal position, with respect to the cam plates 40 and 43, the engaging block 50 of the pawl is out of alinement with the lug 41 of the high speed selecting member 31 as best illustrated by dotted lines in Fig. 11 of the drawings. At such times however, the block 51 is in alinement with the lug 44 of the low speed selecting member 30, so that the forward movement of the pedal mechanism 11 will elevate the pawl 47 engaging the block 50 against the lug 44, moving the low speed cam plate 43 upwardly as well as the low speed gear 52, and thereby revolving the shaft 49 of the speed change gears.

Whenever the gears are in high speed it will be seen that the forward movement of the pedal plate 16 changes the gears to their low speed positions, but as previously noted, a depressing of the set pedal 64 followed by a forward movement of the pedal plate 16 operatively elevates the high speed selecting member 31, unless the member 31 is already elevated, and this changes the mechanism to its high speed arrangement. When the pawl 47 is elevating the low speed member 30 by the engagement of the block 50 with the lug 44, the pawl release 42 on the downwardly moving cam plate 40 will engage the block 50 and pivotally move the pawl 47, releasing the block 50 from the lug 44 when the proper low gear position is reached. This operation is for the purpose of permitting a further forward movement of the lever 17 when it is desired to apply the emergency brake of the automobile, it being noted that a rod 70 adapted for such purpose is pivotally connected at 71 to the said pedal lever 17 of the rear control pedal mechanism 11, while the clutch 15 is released at the same time.

Similarly, when the block 50 is elevating the high speed member 31 by engaging the lug 41 of the plate 40, the pawl release 45 will disconnect the pawl 47 therefrom when the high speed position has been reached and permitting the application of the emergency brake by the rod 70 and the release of the clutch 15. A retaining rack 72 is conveniently mounted upon the frame 19 having a toothed portion 73 adapted for engagement by a spring pressed dog 74 pivoted to the lever 17 at the opposite side thereof from the set lever 66. A release lever 75 is pivoted as at 76 to the lever 17 having its lower end operatively engaging the adjacent end 77 of the dog 74 for maintaining the dog out of engagement with the teeth 73. The foot plate 16 is pivoted as at 78 to the lever 17 and when the upper portion of the plate 16 is forwardly tilted, the same engages an angular extension 79 at the upper end of the lever 75 and moving the same to the dotted line position shown in Fig. 5 which permits the dog 74 to engage the rack teeth 73. A spring 80 connects the lever 75 with the plate 16 for returning the members to their normal position when the foot is released from the plate 16.

When the pedal lever 17 is moved forwardly as heretofore noted, the change speed mechanism will reach its neutral position and the clutch 15 will be released while the dog 74 is brought into a position for engaging the tooth 81 of the rack 72 or in other words, the movement of the lever 17 to this position takes place while the change speed mechanism is shifting from either its low or high arrangement to its neutral position while the further movement of the lever 17 forwardly for engaging the dog 74 with the other teeth 82 of the rack 72 effects an operative shifting of the speed change mechanism to the opposite position from that from which the same had just been shifted. As noted, any forward movement of the pedal lever 17 beyond the point where the pawl 47 is automatically disengaged from the selecting members, results in operating the emergency brake rod 70 for setting the brakes at the rear of the vehicle as the clutch stands released. It will be understood that the dog 74 will remain engaged with any of the teeth 81 or 82 with which the same is in contact until released by a sudden impulse upon the lever 75 effected by pivotally moving the plate 16, the rearward pull upon the lever 17 exerted by the rod 70 being sufficient for this purpose of holding the lever 17 adjusted.

A spring 83 is connected between the web 84 of the pawl 47 and a ring 85 positioned upon the shaft 18 between the hubs 32 and 33, which spring normally maintains the pawl 47 depressed in contact with the faces of the cam plates 40 and 43. A spring 86 connects a depending finger 87 of the collar 53 with the brake rod 70 which normally maintains the set pedal 64 projected forwardly of the plate 16. It will be apparent that the mechanism herein described fulfils the objects for which the same is designed, and that the rear control pedal mechanism 11 is in the nature of an automatic safety appliance for vehicles, rendering it improbable that the vehicle will be stopped or left standing with the gears in their high speed arrangement. The speed change mechanism is always under complete control of the pedal mechanism 11 which may be retained by means of the dog 74 at any desired adjustment such as in neutral position by engaging the rack tooth 81.

While the form of the different parts of the device are believed to be preferable as herein set forth, it will be understood that minor changes may be made therein without departing from the spirit and scope of the appended claims. The operating rod 49 for the speed change mechanism is especially adapted for such a mechanism in which a rotation of the rod 49 to the limit of its movement in opposite directions will change the speeds from high to low and vice versa while an intermediate point may be reached during the rotation in either direction and at which points the change speed mechanism will be positioned at neutral, such for instance as occasioned by the open or neutral positions of a clutch provided as a part of the speed changing device and at which times as heretofore set forth, the rear control pedal lever 17 will be positioned for engaging the dog 74 with the neutral tooth 81 of the rack 72.

The set pedal 64 is slidably arranged through the slot 88 in the pedal plate 16 while the angular extension 79 of the lever 75 engages a wedge-shaped ledge 89 upon the rear of the plate while the positioning spring 80 has one end thereof anchored to the stud 90 adjacent one corner of the said plate 16.

In assembling the pawl 47 upon the axle 48, the pin 59 is inserted through the slot 60 and the hub 54 of the pawl 47 slid upon the axle 48 while the projecting ends of the pin 59 are received within L-shaped grooves 91 formed in the inner wall of the hub 54, the said pin 59 normally assuming the position illustrated by dotted lines in Fig. 9 of the drawings when the device is assembled. This construction permits a slight rotation of the hub 54 upon the axle 48 when the block 50 of the pawl 47 rides upon the releasing means 42 and 45 but the hub 54 cannot leave the axle 48 as the position of the pawl above the selecting members 30 and 31 prevents the shifting of the hub 54 to a position which will permit the ends of the pin 59 to leave the grooves 91.

What I claim as new is:—

1. In combination with an actuating pinion, selecting members geared thereto, an operating lever for said members and a pawl carried by the lever adapted for selective engagement with the said members.

2. In combination with a speed change actuating pinion, arcuate gears in mesh with said pinion, cam plates secured to said gears, an operating lever and a pawl carried by said lever adapted for separately engaging the said plates.

3. In combination with a speed changing pinion, operating cam plates operatively connected thereto, an operating lever for said plates, a pawl carried by the lever adapted for normally engaging one of said plates for setting the mechanism in its low speed engagement and shifting means for the said pawl adapted for positioning the latter for operative engagement with the other plate.

4. In combination with a speed change actuating pinion, arcuate gears in mesh therewith, high and low speed cam plates secured to said gears, lugs upon said plates, an operating pawl for said plates adapted for normally engaging the lug of the low speed plate during the operative movement of the pawl.

5. In combination with a speed change actuating pinion, arcuate gears in mesh therewith, high and low speed cam plates secured to said gears, lugs upon said plates, an operating pawl for said plates adapted for normally engaging the lug of the low speed plate during the operative movement of the pawl, lateral shifting means for the pawl adapted for positioning the pawl in operative alinement with the lug of the high speed plate and an operative lever for the pawl.

6. In combination with a rotatable actuator for speed change mechanism, a pinion attached to said actuator, high and low speed selecting members, comprising a journaled hub, arms carried by said hubs, arcuate gears upon said arms in constant mesh with said pinion, curved cam plates upon said arms and elevating means adapted for singly engaging the said plates.

7. In combination with a rotatable actuator for speed change mechanism, a pinion attached to said actuator, high and low speed selecting members, each comprising a journaled hub, an arm carried by said hub, an arcuate gear upon said arm in constant mesh with said pinion, and a curved cam plate upon said arm, an elevating pawl normally engaging the plate of the low speed member, and means adapted for shifting the said pawl for operative engagement with the plate of the high speed member.

8. In combination with a rotatable actuator for speed change mechanism, a pinion attached to said actuator, high and low speed selecting members, each comprising a journaled hub, an arm carried by said hub, an arcuate gear upon said arm in constant mesh with said pinion, and a curved cam plate upon said arm, an elevating pawl for the plates of said selecting members adapted for normally engaging the plate of the low speed member, means adapted for shifting the said pawl for operative engagement with the plate of the high speed member, an operating lever, sliding pivotal connections between the said pawl and lever, a foot plate upon said lever and a set pedal associated with said plate and lever adapted for laterally shifting the pawl.

9. In combination with speed change mechanism, high and low speed selecting members, each including a cam plate, an elevating pawl for said plates normally arranged adapted for operative engagement with the low speed plate when the pawl is lowered and lateral shifting means for the pawl adapted for operatively positioning the pawl with respect to the high speed plate when the pawl is lowered.

10. In combination with speed change mechanism, high and low speed selecting members, each including a cam plate, an elevating pawl for said plates normally arranged adapted for operative engagement with the low speed plate when the pawl is lowered, lateral shifting means for the pawl adapted for operatively positioning the pawl with respect to the high speed plate when the pawl is lowered, releasing means upon said plate adapted for automatically releasing the pawl from the upgoing plate when the change in speed has been accomplished.

11. In combination with a speed change actuating pinion, high and low speed selecting members operatively connected to said pinion adapted for movement in opposite directions, a pawl adapted for elevating said selecting members individually during the speed changing operation, engaging means upon one of said selecting members within the normal path of travel of the pawl, lateral shifting means for the pawl and an engaging member upon the other selecting member within the path of movement of the pawl when shifted.

12. In combination with a speed change actuating pinion, high and low speed selecting members operatively connected to said pinion adapted for movement in opposite directions, a pawl adapted for elevating said selecting members individually during the speed changing operation, engaging means upon one of said selecting members within the normal path of travel of the pawl, lateral shifting means for the pawl, an engaging member upon the other selecting member within the path of movement of the pawl when shifted, with the first-named engaging member out of the path of movement thereof and automatic releasing means for the pawl carried by said selecting members adapted for operation at the completion of the speed changing movement of said selecting members.

13. In combination with a speed change actuator, high and low speed selecting members operatively attached thereto, an operating lever, an actuating pawl for said selecting members normally positioned operatively with respect to the low speed selecting member and journaled upon said lever and lateral shifting means for the pawl carried by the lever adapted for positioning the latter operatively with respect to the high speed selecting member.

14. In combination with a speed change actuator, high and low speed selecting members operatively attached thereto, an operating lever, an actuating pawl for said selecting members normally positioned operatively with respect to the low speed selecting member and journaled upon said lever, a collar adapted for laterally shifting said pawl operatively with respect to the high speed selecting member carried by said lever adjacent the pawl, a set lever linked to said collar and separate operating pedals for said levers.

15. In combination with a speed change actuator, high and low speed selecting members operatively attached thereto, an operating lever, an actuating pawl for said selecting members normally positioned operatively with respect to the low speed selecting member and journaled upon said lever, lateral shifting means for the pawl carried by the lever adapted for positioning the latter operatively with respect to the high speed selecting member, disengaging means for said pawl and selecting members, automatically operable upon the completion of the speed changing movement, and emergency brake connections for said lever operable subsequent to said disengagement of the pawl.

16. Speed changing pedal mechanism comprising a lever, a speed changing pawl carried by said lever adapted for speed-reduction when moved in its normal position, a foot plate upon said lever having an opening therethrough, a set pedal arranged in said opening normally projecting from the face of said plate and shifting means for the pawl operatively connected to the set pedal adapted for positioning the pawl in its high speed arrangement when the set pedal is depressed during the operation of said lever.

17. In combination with a lever, a foot plate pivoted thereon, speed change connections for said lever, a retaining dog on the lever, releasing means for the dog operatively associated with said plate, a retaining rack for the dog having a tooth adapted for engagement by the dog when the lever is positioned with the mechanism in its neutral arrangement, an emergency brake rod pivoted to said lever adapted for operative movement subsequent to speed changing movements of the lever and a normal positioning spring for the plate.

18. In combination with a pedal lever, an axle projecting therefrom having a central bore and a transverse slot, a pawl having a hub mounted upon said axle arranged with angular grooves on its inner face, a pin extending through said slot with its opposite ends positioned in the said grooves, an operating collar journaled upon said axle between said lever and pawl and having operative connections with the hub of the pawl and a normal positioning spring for the pawl arranged within said bore bearing against the pin.

In testimony whereof I affix my signature.

JAMES A. FRIDDLE.